Nov. 28, 1933.  T. H. BARTH  1,936,576
SIGHTING APPARATUS
Filed July 15, 1931  4 Sheets-Sheet 1
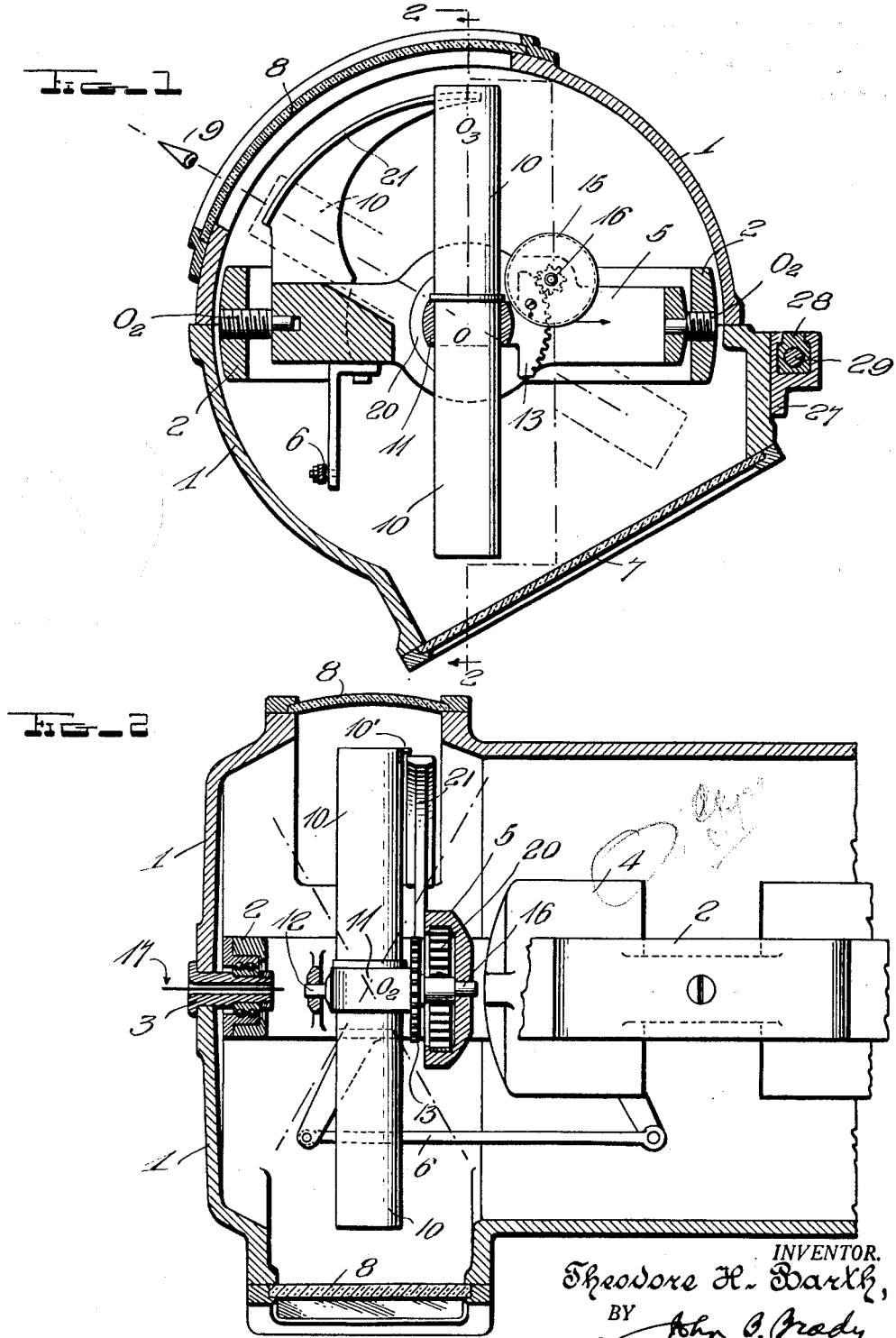
INVENTOR.
Theodore H. Barth,
BY
John C. Brady
ATTORNEY

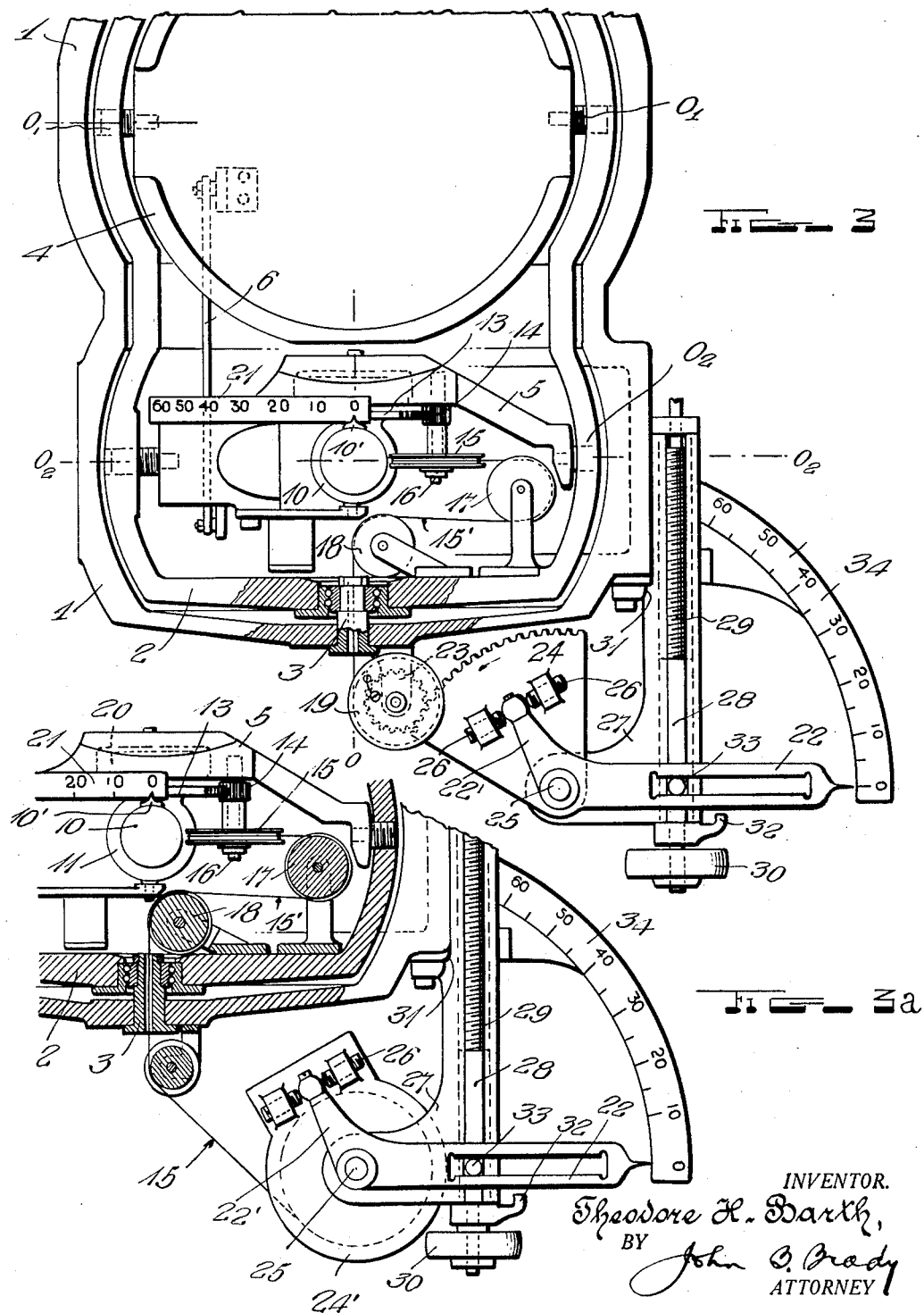

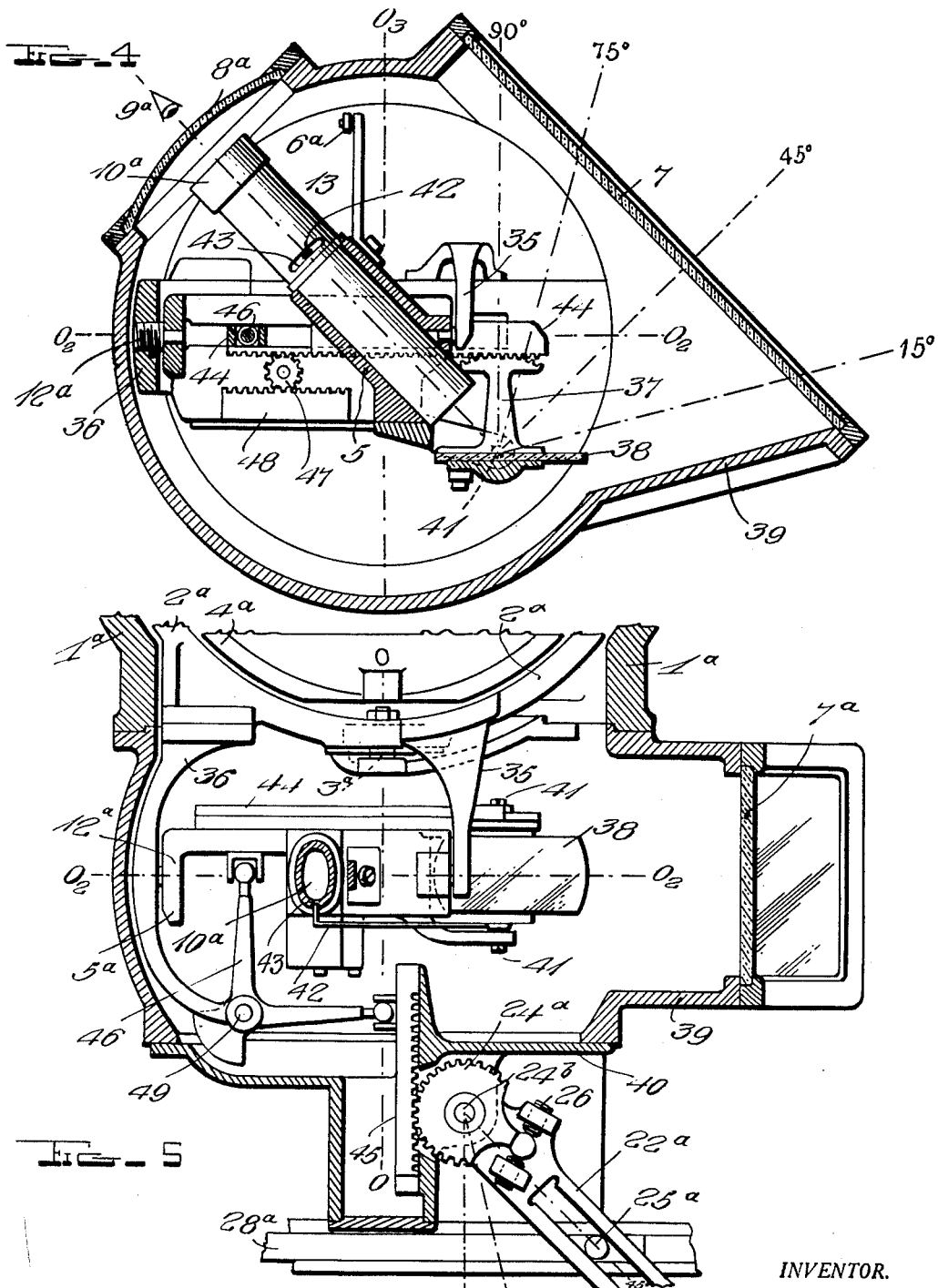

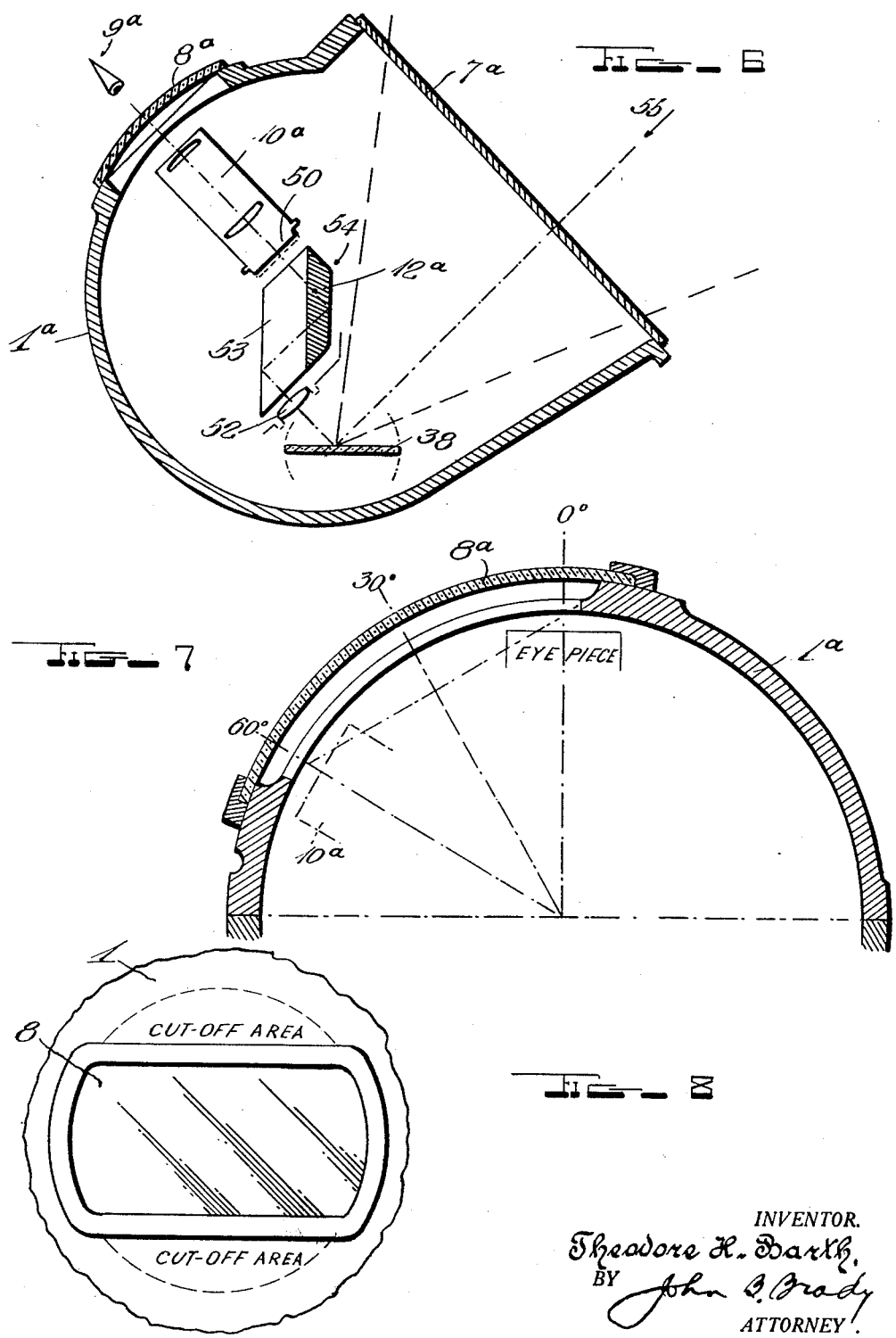

33. GEOMETRICAL INSTRUMENTS.

Search Room

Patented Nov. 28, 1933

1,936,576

UNITED STATES PATENT OFFICE 1,936,576

SIGHTING APPARATUS

Theodore H. Barth, New York, N. Y., assignor to Carl L. Norden, Inc., New York, N. Y., a corporation of New York Application July 15, 1931. Serial No. 551,007

7 Claims. (Cl. 33—46.5)

My invention relates to sighting devices or instruments used for obtaining the rate of linear or of angular motion, or the bearing angles, or of some other sight-function of a distant, apparently moving object in reference to a stabilized plane or case.

The instrument of my invention is particularly adapted to be carried by, and used on ships or on aeroplanes for performing various sighting operations.

One of the objects of my invention is to provide means whereby complex functional mechanism in connection with stabilized, tilting, sight-planes can be transferred from the stabilized case to a non-stabilized case without impairing its functional effect and in such manner that the operation and adjustment of such mechanism does not affect the stabilized system.

Further objects of my invention are, to decrease the number of parts requiring stabilization and static balancing and to render possible the use of a complete optical system on the stabilized case in a non-tilting, non-rotatable sight case, thereby eliminating optical as well as mechanical parallax.

Other and further objects of my invention will be understood from the specification hereinafter following by references to the accompanying drawings, in which:

Figure 1 is a vertical sectional view taken through the stabilized sight-system of my invention; Fig. 2 is a vertical sectional view through the stabilized sight-system of my invention taken on line 2—2 of Fig. 1; Fig. 3 is a plan view of a portion of the stabilized sight-system of my invention with the upper section of the casing removed and showing parts broken away and illustrated in section; Fig. 3a is a view similar to Fig. 3 showing a slightly modified construction; Fig. 4 is a vertical sectional view of a modified form of sight-system suitable for use on board of a ship; Fig. 5 is a top plan view of the modified form of sight-system shown in Fig. 4; Figs. 6 and 7 are theoretical views explaining the principles of my invention; and Fig. 8 is a view looking at the upper sight window of the casing.

The stabilized sight case may be a gyroscope suspended in a cardan or a case or cradle suspended in the same or in an adjacent cardan, and stabilized by said gyroscope by means of connecting rods or gearing.

One or two right angle sight-planes may be given by a cross line or by two right angle cross lines in the focal plane of an objective on the stabilized case, and either tilting, or non-tilting in connection with a tilting mirror or a turning prism, or such sight-planes may be provided in some other manner.

My invention is directed to the application of operating means embodying the characteristics of correspondence of angular position, and thereby angular motion, between the stabilized sight-planes and non-stabilized control parts. My invention renders practical the use of the very complex mechanism required by synchronizing sights, such as synchronizing devices, integrators, predicting and averaging devices, differential setting gears, servo motors, governors, clutches, and so forth, and materially improves and simplifies the design and operation of timing sights as well as drift or ground speed instruments.

Referring to the drawings in detail, reference character 1 designates a casing having upper and lower sections secured to each other. Mounted in the case 1 and arranged to tilt on axis O, but axially fixed in place by gudgeon 3, is cardan 2 which carries gyroscope 4 and cradle 5, mounted on parallel axes $O_1$ and $O_2$, connected for parallel motion by rod 6. The axis $O_1$ about which the gyroscope turns and the axis $O_2$ of cradle 5 remain parallel when the system is set, regardless of aeroplane roll or pitch motion, so that the case or cradle 5 is stabilized on two intersecting axes O and $O_2$.

The tilting sight-plane is here given by an athwart reticule cross-line of telescope 10, which gives an upright field picture at its exit pupil at 9 where the observer's eye is indicated for a 60° telescope position.

Reference characters 7 and 8 indicate sight slots in case 1 closed by glass windows and of sufficient width to allow for reasonable roll and pitch motion. The telescope 10 is shown in an upright position in full lines, and tilted positions are indicated by dotted lines. It is fixed into collar 11 which tilts on gudgeons 12 in cradle 5. Integral with collar 11 is gear sector 13. The entire tilting unit is balanced for the tilting axis. Gear sector 13 meshes with pinion 14 which forms part of a sleeve to which cradle drum 15 is fixed. The sleeve and drum turn on stud or stud axle 16, fixed in cradle 5. The cradle drum position is such that a flexible metal cable 15' fixed to this drum and leading to sheave 17, coincides with cradle tilting axis $O_2$.

Passing over sheave 17 to sheave 18, the cable coincides with cardan axis O till it reaches case drum 19, to which it is fixed. Sheaves 17 and 18 are mounted in brackets fixed to cardan 2.

The collar 11 is subject to torque from spring 20, the outer end of which is fixed in cradle 5. This spring tends to turn the telescope toward its 60° position with fairly uniform effort. There are no stops to limit the angular tilt, hence the operating cable, as well as all gears, are always subject to tension caused by spring 20.

The gyroscope, as well as cradle 5, are secured against axial motion, and the complete stabilized system is balanced statically by counterweights. The drums shown, utilize less than one cable turn, hence have single grooves. Drums using more that one turn can, however, be used. Fixed to cradle 5 is shown scale 21, against which an indicator 10' fixed to the telescope shows the angular position of the sight-plane in reference to the cradle vertical or to the plane given by the telescope tilting axis and the cradle tilting axis. An indicator position of 0° denotes that the sight-plane is vertical to the $O_2$ axis. A complete scale is shown, but a single position mark say at 0°, or at 20° or 30° would be sufficient for coincident adjustment.

Generally, drum 19 has a geared connection to a cooperating pointer 22, drum pinion 23 meshing with the gear sector 24 which turns on stud 25 on which 22 also turns. The pointer 22 is adjustably fixed to sector 24 by set screws 26 in contact with an extension or arm 22' projecting from the pointed end of the pointer, the screws being threaded through lugs projecting from a side face of the sector 24 in spaced relation to each other transversely thereof. Drum 19 and pinion 23 turn on a stud fixed to case 1. Stud 25 is fixed to bracket 27 extending from case 1. This bracket forms a guide for bar 28, movable by means of lead screw 29, which is axially retained at the knob end by the member 32 and can be turned by knob 30. The sliding bar 28 carries a pin 33, fitting in a slot formed longitudinally in the pointer radially of the stud 25 for effecting the movement of the pointer when the screw is turned and the free end of the pointer is formed with a finger overlapping an arcuate scale 34 in order to indicate the position of the pointer and permit adjustments to be accurately made. Instead of leading to drum 19, the cable may lead to a concentric groove formed in a disk 24' mounted upon the stud 25 in place of the sector 24 as shown in Fig. 3a.

The arrangement of these parts is immaterial. The first characteristic condition is, that the rate of angular motion of the pointer 22 relative to case 1, corresponds to or is identical with the rate of angular motion of the tilting sight-plane relative to cradle 5. This is obtained by suitable drum diameters and gear ratios, and by local correction of the cable groove radius of the case drum.

The second characteristic is the adjustment of the tilting sight-plane on its cradle scale 21 or for a particular key position so as to coincide with the position of correspondent part 22 on its scale 34. For instance, if the latter, as shown, is at its zero position, the sight-plane must be adjusted to its zero or vertical position on its cradle scale. To obtain this coincidence a form of adjustment in connection with the scales and indicators and a form of optical means for checking positions, and mechanical means for adjustment, are provided.

A third characteristic is that this correspondence of position and, therefore, of motion, must not be affected by case motions, and the mechanical or electrical transmission system must not affect the stabilized system. In the arrangement shown, liberal case roll or pitch motions cause but slight twisting of those flexible cable parts coincident with the cradle, respectively, the cardan axis, not affecting the active cable length nor disturbing the stabilized system.

The sight-plane tilting axis and the cradle tilting axis determine a stabilized reference plane which is set to a horizontal position when the sight is used. If the cross-line is kept on an apparently moving object, the component of the latter's apparent speed in a plane parallel to the above reference plane, and in a direction to the vertical through the sight, is proportional to the velocity of bar 28 against bracket 27.

If, for instance, the sight is flown in the direction of an object on the ground, the aeroplane maintaining constant speed and altitude, and the cross-line is kept on said object by turning knob 30, this knob and lead spindle 29 would be turned with constant speed, and bar 28 would also move with constant speed, a linear function of the so-called ground-speed.

Bar 28 may be called the ground speed bar. This bar is shown carried on the non-stabilized case together with the mechanism required to utilize its motion for purposes of timing or of synchronizing, and of solving questions in connection with object bearing angles. It is the specific feature and merit of my invention to have these parts mounted upon the non-stabilized case by means of the principle of corresponding motion of parts with coincidence adjustment, so that only the tilting sight-plane or planes need to be stabilized, and practically unlimited mechanism, non-stabilized and accessible, can be used in connection with said sight-planes, thus providing a new departure in sight construction.

Figs. 4 and 5 show a sight for use on board a vessel. The entire optical system is stabilized by gyroscope 4a in cardan 2a, which is axially fixed at cardan gudgeon 3a, and is free to tilt ± 30° or more on axis O. The lower half of the main sight case is designated by 1a, the upper half being removed. Case 1a is provided with sight windows 7$^a$ and 8$^a$.

Cradle 5a is mounted on gudgeon 12a and tilts on axis $O_2$ and is stabilized for this axis by rod 6$^a$, connected to the gyroscope for parallel motion. The cradle gudgeons are carried by brackets 35 and 36 which are fixed to the cardan. Tilting axis $O_2$ may intersect cardan axis O. The optical system consists of non-erecting telescope 10, fixed in cradle 5a and a tilting mirror 38 hinged on gudgeons 41 of the cradle, and rotating the sight-plane from 15° to 90° as indicated. The observer's eye is at 9. For the mirror position shown, the sight-plane given by the reticle cross-line is at 45° to axis $O_2$. The mirror case carries an indicator 42 which enters slot 43 and lines up with the reticle cross-line when the sight-plane is at 90° to axis $O_2$. This position is adjusted for coincidence with the 90° position of the pointer 22$^a$. The scale for the pointer 22$^a$ is not shown but the scale will correspond to the scale 34 and have divisions indicated in degrees.

The mechanical transmission is effected by means of rack bars carrying forks with hardened parallel working surfaces at right angles to the direction of bar motion and axis O and $O_2$ respectively. Fork rack 44 meshes with gear sector 37 which is part of the tilting mirror assembly, and with idler 47, which turns on a stud fixed to cradle 5, and moves counterweight rack 48, also sliding on cradle 5. These racks slide on cradle 5 with very little play and are retained by guides. The mirror assembly is balanced for the tilting axis. Racks 48 and 44 have equal weight. Fork rack 45 slides on and in cover 40, and is meshed with gear sector 24ª turning on a stud 24ᵇ. Turning on the same stud fulcrum is the pointer 22ᵇ, against which the position of sector 24ª can be adjusted. Bar 28ª moves part 22ª by means of stud 25ª, fixed to this bar. The motion of nonstabilized rack bar 45 is transmitted to stabilized rack bar 44 by means of balanced crank lever 46, turning on pin 49 in cardan bracket 36. The arms are equally long and end in hardened balls fitting the forks of the bars. The ball centers move in planes through axis O and O₂ respectively, and have average contact points near these axes. There is correspondence of motion between bars 45 and 44 over the entire working stroke.

If the gear 24ª has half the pitch radius of gear 37, there will be correspondence of angular motion between pointer 22ª and the tilting or rotating sight-plane, which is adjustable for coincidence for the 90° position. Hence, bar 28ª has the same motion that a bar would have if it were sliding on cradle 5 parallel to O₂, moved by a stud pin fixed to it and working in a slot represented by the rotating sight-plane. The motion and position of bar 28ª and pointer 22ª can therefore be used to determine the motion component parallel to the O—O₂ plane of a distant object and bearing angles and angular bearing velocities with reference to the 90° plane, which could be set on the sea horizon. The entire calculating, operating and indicating mechanism working in connection with parts 22 and 28ª are mounted non-stabilized, whereas the entire optical system is stabilized, illustrating again the principle of my invention.

In Figs. 6 and 7, I have shown the optical elements employed in the sighting apparatus of my invention in schematic arrangement. The telescope 10ª is shown as having reticule 50. Light passes from the position 55 to the tilting mirror 38 where it is reflected through the objective lens system 52 to the reflecting surface of prism 53. The light passes to the roof prism at 54 and then through the reticule 50 and telescope 10ª to the observer at 9ª. The center of case motion is indicated at 12ª. The range of movement of the telescope 10ª within the crystal window 8ª is represented by the effective area bounded in full lines within the cut-off space, as shown in Fig. 7. The plate glass 7ª is shown extending across the field of the instrument, as heretofore described.

While I have illustrated my invention in certain preferred embodiments, I desire that it be understood, that modifications may be made and that no limitations upon my invention are intended other than are imposed by the scope of the appended claims.

What I claim as new and desire to secure by Letters Patent of the United States is as follows:

1. Sighting apparatus comprising a casing, a frame in said casing pivoted at its ends to the casing, a gyroscope in one end portion of said frame pivoted to side portions thereof for tilting at right angles to movement of the frame, a cradle in the other end portion of said frame pivoted to side portions thereof for tilting about an axis parallel to the axis of the gyroscope, a sighting instrument carried by said cradle and tiltable about an axis coincident to the axis of said frame, and means for adjusting the angle of said instrument including actuating means mounted outside the casing, and means for transmitting motion from the actuating means to the sighting instrument including a belt passing into the casing through the pivot mounting on one end of said frame.

2. Sighting apparatus comprising a casing, a frame in said casing pivoted at its ends to the casing, a gyroscope in one end portion of said frame pivoted to side portions thereof for tilting at right angles to movement of the frame, a cradle in the other end portion of said frame pivoted to side portions thereof for tilting about an axis parallel to the axis of the gyroscope, a sighting instrument carried by said cradle and tiltable about an axis conicident to the axis of said frame, a scale carried by said cradle, an indicator carried by said sighting instrument coacting with said scale for indicating the angle of the sighting instrument, and means for adjusting the angle of said sighting instrument including a lever pivotally mounted externally of said casing and having one end terminating in a pointer, a scale cooperating with the pointer on said lever, shifting means for said lever, and means for transmitting motion from said lever to the sighting instrument.

3. Sighting apparatus comprising a casing, a frame in said casing pivoted at its ends to the casing, a gyroscope in one end portion of said frame pivoted to side portions thereof for tilting at right angles to the movement of the frame, a cradle in the other end portion of said frame pivoted to the sides thereof for tilting about an axis parallel to the axis of the gyroscope, a sighting instrument carried by said cradle and tiltable about an axis coincident to the axis of said frame, a spring connected to resist tilting movement of said instrument in one direction, a gear segment carried by said instrument concentric to its axis, a drum in said casing and a gear turning therewith and meshing with said gear segment to adjust the angle of the sighting instrument, operating means outside of said casing including a rotatable drum and means for rotating the same, and a cable extending into said casing through a pivot for one end of said frame with its end portions engaged about said drums and serving to transmit motion from the outer drum to the inner drum when the operating means is actuated.

4. Sighting apparatus comprising a casing, a frame in said casing pivoted at its ends to the casing, a gyroscope in one end portion of said frame pivoted to side portions thereof for tilting at right angles to the movement of the frame, a cradle in the other end portion of said frame pivoted to the sides thereof for tilting about an axis parallel to the axis of the gyroscope, a sighting instrument carried by said cradle and tiltable about an axis coincident to the axis of said frame, a spring connected to resist tilting movement of said instrument in one direction, a gear segment carried by said instrument concentric to its axis, a drum in said casing and a gear turning therewith and meshing with said gear segment to adjust the angle of the sighting instrument, a drum rotatably mounted outside said casing, a cable extending into said casing through the pivot for one end of said frame with its end portions engaged about the drums for transmitting rotation to the inner drum when the outer drum is rotated, and a lever for controlling the rotation of the outer drum.

5. Sighting apparatus comprising a casing, frame in said casing pivoted at its ends to the casing, a gyroscope in one end portion of said frame pivoted to side portions thereof for tilting at right angles to the movement of the frame, a cradle in the other end portion of said frame pivoted to the sides thereof for tilting about an axis parallel to the axis of the gyroscope, a sighting instrument carried by said cradle and tiltable about an axis coincident to the axis of said frame, a spring connected to resist tilting movement of said instrument in one direction, a gear segment carried by said instrument concentric to its axis, a drum in said casing and a gear turning therewith and meshing with said gear segment to adjust the angle of the sighting instrument, a drum rotatably mounted outside said casing, a cable extending into said casing through the pivot for one end of said frame with its end portions engaged about the drums for transmitting rotation to the inner drum when the outer drum is rotated, a lever pivoted intermediate its length, abutments carried by the outer drum and engaging one end of said lever from opposite sides thereof to cause the drum to rotate when the lever is moved, and means for adjusting the position of said lever.

6. Sighting apparatus comprising a casing, a frame in said casing pivoted at its end to the casing, a gyroscope in one end portion of said frame pivoted to sides thereof for tilting at right angles to movement of the frame, a cradle in the other end portion of said frame pivoted to the sides thereof for tilting about an axis parallel to the axis of the gyroscope, a sighting instrument carried by said cradle and tiltable about an axis coincident to the axis of the frame, a spring connected to resist tilting movement of said instrument in one direction, a drum in said casing, means for transmitting rotation from said drum to said instrument to adjust the angle of the instrument, a drum rotatably mounted outside said casing, a cable extending into said casing through the pivot for one end of said frame with its end portions engaged about the drums for transmitting rotation to the inner drum when the outer drum is rotated, a lever pivoted intermediate its length, means for transmitting motion from said lever to the outer drum including abutments engaging an end of the drum from opposite sides and adjustable towards and away from the drum, and means for controlling movement of said lever.

7. Sighting apparatus comprising a casing, a frame in said casing pivoted at its end to the casing, a gyroscope in one end portion of said frame pivoted to sides thereof for tilting at right angles to movement of the frame, a cradle in the other end portion of said frame pivoted to the sides thereof for tilting about an axis parallel to the axis of the gyroscope, a sighting instrument carried by said cradle and tiltable about an axis coincident to the axis of the frame, a spring connected to resist tilting movement of said instrument in one direction, a drum in said casing, means for transmitting rotation from said drum to said instrument to adjust the angle of the instrument, a drum rotatably mounted outside said casing, a cable extending into said casing through the pivot for one end of said frame with its end portions engaged about the drums for transmitting rotation to the inner drum when the outer drum is rotated, a lever pivoted intermediate its length, means for transmitting motion from said lever to the outer drum including abutments engaging an end of the drum from opposite sides thereof, the other end portion of the lever having a longitudinally extending slot formed therein, a threaded actuating shaft rotatably mounted, and a block moved by rotation of said shaft and engaged in the slot to adjust the lever when the shaft is rotated.

THEODORE H. BARTH.